United States Patent
Kang et al.

(10) Patent No.: US 9,380,499 B2
(45) Date of Patent: Jun. 28, 2016

(54) APPARATUS AND METHOD FOR SUPPORTING COOPERATIVE HANDOVER IN BROADBAND WIRELESS COMMUNICATION SYSTEM

(75) Inventors: Hyon-Goo Kang, Suwon-si (KR); Hyeong-Jong Ju, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 13/085,272

(22) Filed: Apr. 12, 2011

(65) Prior Publication Data

US 2011/0249651 A1    Oct. 13, 2011

(30) Foreign Application Priority Data

Apr. 12, 2010   (KR) .................. 10-2010-0033177

(51) Int. Cl.
*H04W 36/00*   (2009.01)
*H04W 76/02*   (2009.01)
*H04W 84/04*   (2009.01)

(52) U.S. Cl.
CPC ...... *H04W 36/0033* (2013.01); *H04W 36/0083* (2013.01); *H04W 76/021* (2013.01); *H04W 84/045* (2013.01)

(58) Field of Classification Search
None
See application file for complete search history.

(56) References Cited

U.S. PATENT DOCUMENTS

| 7,493,090 B2 | 2/2009 | Lee et al. | |
|---|---|---|---|
| 8,185,114 B2 | 5/2012 | Kim et al. | |
| 2005/0282548 A1 | 12/2005 | Kim et al. | |
| 2006/0030322 A1 | 2/2006 | Kim et al. | |
| 2006/0111111 A1 | 5/2006 | Ovadia | |
| 2006/0121903 A1 | 6/2006 | Lee et al. | |
| 2006/0276189 A1 | 12/2006 | Kiernan et al. | |
| 2007/0232307 A1* | 10/2007 | Ibrahim et al. | 455/436 |
| 2007/0238464 A1 | 10/2007 | Lim et al. | |
| 2008/0268844 A1* | 10/2008 | Ma et al. | 455/436 |
| 2009/0042567 A1 | 2/2009 | Lim et al. | |
| 2009/0069024 A1* | 3/2009 | Lee et al. | 455/450 |
| 2009/0074189 A1* | 3/2009 | Ryu | H04L 63/0823 380/277 |
| 2009/0111473 A1* | 4/2009 | Tao et al. | 455/440 |
| 2009/0207809 A1 | 8/2009 | Son et al. | |
| 2009/0312021 A1 | 12/2009 | Kim | |
| 2010/0046413 A1* | 2/2010 | Jin et al. | 370/315 |
| 2010/0056158 A1* | 3/2010 | Du | H04W 36/0055 455/438 |
| 2010/0091739 A1* | 4/2010 | Dayal et al. | 370/332 |

(Continued)

FOREIGN PATENT DOCUMENTS

| CN | 101044782 A | 9/2007 |
|---|---|---|
| CN | 101080883 A | 11/2007 |

(Continued)

OTHER PUBLICATIONS

Eurropean Search Report in connection with European Application No. 11161994.6, dated Jul. 20, 2011.

(Continued)

*Primary Examiner* — Ashley Shivers

(57) ABSTRACT

An apparatus and method for supporting a cooperative handover in a broadband wireless communication system. A method for operating a mobile station (MS) for a cooperative handover in a broadband wireless communication system includes determining a handover to a target BS and omitting a CID update process of the MS during the handover process to the target BS, wherein the CID of the MS is shared beforehand between a serving BS and the target BS.

34 Claims, 12 Drawing Sheets

(56) References Cited

U.S. PATENT DOCUMENTS

2010/0172326 A1     7/2010    Kim et al.
2012/0087338 A1*   4/2012    Brandt et al. ................ 370/331

FOREIGN PATENT DOCUMENTS

| JP | 2008502269 A | 1/2008 |
| JP | 2008519541 A | 6/2008 |
| KR | 10-2005-0116319 | 12/2005 |
| KR | 10-2007-0098385 | 10/2007 |
| KR | 10-2009-0014685 | 2/2009 |
| KR | 10-2009-0089981 | 8/2009 |

OTHER PUBLICATIONS

First Office Action dated Sep. 22, 2014 in connection with Chinese Patent Application No. 201110098302.3; 15 pages.

Notice of Preliminary Rejection dated Jan. 13, 2015 in connection with Japanese Patent Application No. 2011-088061; 9 pages.

Notice of Preliminary Rejection dated Nov. 9, 2015 in connection with Japanese Patent Application No. 2011-088061; 12 pages.

Korean Office Action issued for KR 10-2010-0033177 dated Mar. 8, 2016, 11 pgs.

\* cited by examiner

APPARATUS AND METHOD FOR SUPPORTING COOPERATIVE HANDOVER IN BROADBAND WIRELESS COMMUNICATION SYSTEM

CROSS-REFERENCE TO RELATED APPLICATION(S) AND CLAIM OF PRIORITY

The present application is related to and claims priority under 35 U.S.C. §119 to an application filed in the Korean Intellectual Property Office on Apr. 12, 2010 and assigned Serial No. 10-2010-0033177, the contents of which are incorporated herein by reference.

TECHNICAL FIELD OF THE INVENTION

The present invention relates generally to a broadband wireless communication system, and in particular, to an apparatus and method for supporting a cooperative handover in a broadband wireless communication system.

BACKGROUND OF THE INVENTION

Nowadays, many wireless communication schemes are being proposed as candidates for high-rate mobile communication. Among them, an OFDM (Orthogonal Frequency Division Multiplexing) scheme is being esteemed as the most prominent next-generation wireless communication scheme. The OFDM scheme is expected to be used in most future wireless communication schemes. The OFDM scheme is also adopted as the standard in an IEEE 802.16 WMAN (Wireless Metropolitan Area Network) called a $3.5^{th}$ generation (3.5G) technology.

The OFDM scheme uses multi carriers to transmit data. That is, the OFDM scheme is a kind of multi-carrier modulation (MCM) scheme that parallelizes serial input symbols and modulates the parallel symbols with a plurality of orthogonal subcarriers (i.e., subchannels) prior to transmission.

In a cellular wireless communication system, the quality of a communication between a mobile station (MS) and a base station (BS) degrades due to poor channel conditions caused by the geographical conditions in a cell, the distance between an MS and a BS, or the movement of an MS. For example, even in a coverage area of the BS, propagation shadow areas may be caused by closed buildings such as offices and houses. If the MS is located in the propagation shadow area, the BS may not perform a smooth communication due to the poor channel condition with the MS.

Thus, the wireless communication system may provide a femto-cell service for providing a high-rate data service while overcoming the problem of a service in the propagation shadow area. The femto cell is a cell created by a compact BS that is located in a building such as an office or a house and is connected to a mobile communication core network through a broadband network. The compact BS is a low-power BS installed by a user. The compact BS may be called a micro BS, a self-configurable BS, an indoor BS, a home BS, or a femto BS. Hereinafter, the compact BS will be referred to as a femto BS.

A handover interruption time is one of the most important performance indicators. In a handover process, an MS releases a connection with a serving BS and establishes a connection with a target BS. Herein, a time period from the time point of releasing the connection with the serving BS to the time point of receiving data packet from the target BS through the connection with the target BS may be defined as the handover interruption time. The handover interruption time may be regarded as an important performance indicator because it determines the possibility of service continuity, that is, seamless services. The handover interruption time is affected by the time taken to perform a handover process between the MS and the target BS.

In a handover of an MS to a target BS, the 802.16e Mobile WiMAX system exchanges a ranging request message and a ranging response message between the MS and the target BS to update a connection identifier (CID) to be used in the target BS by the MS and perform mutual authentication between the BS and the MS. Accordingly, downlink (DL) and uplink (UL) service traffics are not transmitted to the MS during the handover of the MS to the target BS. This may be regarded as a service interruption from the user's standpoint.

SUMMARY OF THE INVENTION

To address the above-discussed deficiencies of the prior art, it is a primary aspect of the present invention is to substantially solve at least the above problems and/or disadvantages and to provide at least the advantages below. Accordingly, an object of the present invention is to provide an apparatus and method for supporting a cooperative handover in a broadband wireless communication system.

Another object of the present invention is to provide an apparatus and method for a primary base station (BS) to allocate a connection identifier (CID) to a mobile station (MS), having initially entered the primary BS or a secondary BS, and share the CID of the MS with the secondary BS in a broadband wireless communication system including the primary BS and the secondary BS that support a cooperative handover.

Another object of the present invention is to provide an apparatus and method for reducing a handover latency time of an MS by selectively omitting the CID update or the authentication and key update through the exchange of Ranging Request/Response messages by detecting the fact that a primary BS and a secondary BS cooperate with each other and share a CID of the MS, in an MS handover between the primary BS and the secondary BS in a broadband wireless communication system.

According to an aspect of the present invention, a method for operating an MS for a cooperative handover in a wireless communication system includes determining a handover to a target BS. The method also includes omitting a CID update process of the MS during the handover process to the target BS, wherein the CID of the MS is beforehand shared between a serving BS and the target BS.

According to another aspect of the present invention, a method for operating a target BS for a cooperative handover in a wireless communication system includes beforehand sharing a CID of an MS with a serving BS of the MS. The method also includes omitting a CID update process of the MS during a handover process to the MS.

According to another aspect of the present invention, an apparatus of an MS for a cooperative handover in a wireless communication system includes a handover manager configured to determine a handover to a target BS and omit a CID update process of the MS during the handover process to the target BS. The apparatus also includes a transmitter/receiver configured to transmit/receive handover-related information for a handover process with the target BS, wherein the CID of the MS is beforehand shared between a serving BS and the target BS.

According to another aspect of the present invention, an apparatus of a target BS for a cooperative handover in a wireless communication system includes a network entry manager configured to beforehand share a CID of an MS with a serving BS of the MS. The apparatus also includes a handover manager configured to omit a CID update process of the MS during a handover process to the MS.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides a scheme for supporting a cooperative handover in a broadband wireless communication system. Examples of the broadband wireless communication system include an 802.16e/16m WiMAX system and a 3GPP LTE system, to which the present invention is not limited.

Figure 1:
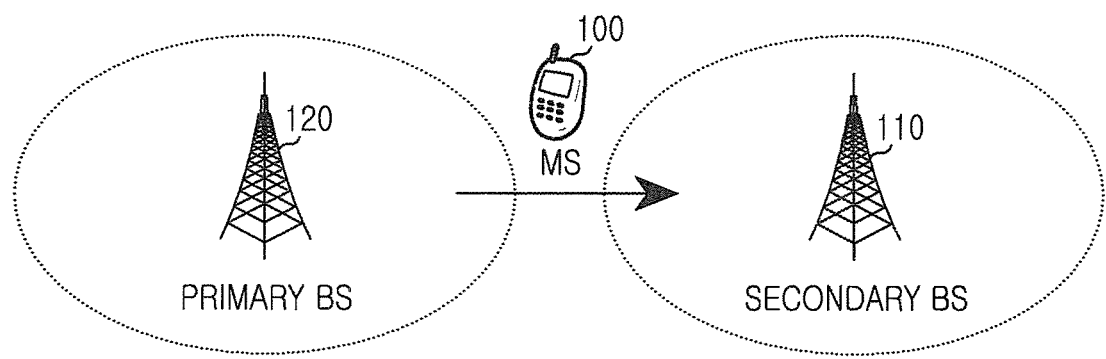
FIG. 1 illustrates a broadband wireless communication system according to an embodiment of the present invention.

FIG. 1 is a diagram illustrating a broadband wireless communication system according to an embodiment of the present invention.

Referring to FIG. 1, a broadband wireless communication system according to an embodiment of the present invention includes a mobile station (MS) 100, a secondary base station (BS) 110, and a primary BS 120. The broadband wireless communication system may include a plurality of MSs 100, a plurality of secondary BSs 110, and a plurality of primary BSs 120. Herein, each of the primary BS 120 and the secondary BS 110 may include a first macro BS and a second macro BS, or may include a macro BS and a femto BS subordinated hierarchically to the macro BS, or may include a first femto BS and a second femto BS.

The primary BS 120 and the secondary BS 110 cooperate with each other to support a cooperative handover according to an embodiment of the present invention. In order to support the cooperative handover, the primary BS 120 allocates a connection identifier (CID) not only to the MS 100 within its own coverage but also to the MS 100 within the coverage of the secondary BS 110. That is, the primary BS 120 allocates a CID to the MS 100, having initially entered the coverage area of primary BS 120, in the conventional manner, and the secondary BS 110 allocates a CID to the MS 100, having initially entered the coverage area of secondary BS 110, through the primary BS 120 cooperating with the secondary BS 110, which will be described below in detail with reference to FIG. 2. Accordingly, the primary BS 120 and the secondary BS 110 share the CID of the MS 100.

In this manner, the primary BS 120 and the secondary BS 110 cooperate with each other and share the CID of the MS 100. Accordingly, the CID update or the authorization and key update through the exchange of Ranging Request/Response messages may be selectively omitted in an MS handover between the primary BS 120 and the secondary BS 110. To this end, the MS 100 may need to have information about a neighbor BS cooperating with a serving BS. Thus, the present invention provides a scheme for notifying an MS of information about a neighbor BS cooperating with a serving BS supporting a cooperative handover, by including cooperative handover support/non-support information of the neighbor BS in a Neighbor Advertisement (MOB_NBR-ADV) message that is periodically broadcasted from the serving BS to the MS to notify a neighbor BS list to the MS.

Herein, the Neighbor Advertisement message includes a 1-byte TLV (Type-Length-Value) 'Cooperative HO Support' field that indicates in a bit-map format whether the neighbor BS supports a cooperative handover in combination with the serving BS. The bit #0 of the 'Cooperative HO Support' field indicates whether to omit the CID update through the exchange of Ranging Request/Response messages, the bit #1 indicates whether to omit the authentication and key update through the exchange of Ranging Request/Response messages, and the other bits #2 to #7 are reserved bits. Herein, a value '1' indicates the support of the cooperative handover, and a value '0' indicates the non-support of the cooperative handover.

For example, if the bit #0 of the 'Cooperative HO Support' field in the Neighbor Advertisement message has a value '1' and the bit #1 has a value '1', because the serving BS and the neighbor BS share the CID and the authentication information of the MS, the MS may omit the exchange of Ranging Request/Response messages for the CID update and the authentication and key update in a handover to the neighbor BS. This will be described below in detail with reference to FIG. 3.

As another example, if the bit #0 and the bit #1 of the 'Cooperative HO Support' field in the Neighbor Advertisement message have a value '1' and a value '0' respectively, because the serving BS and the neighbor BS share the CID of the MS, the MS may omit the exchange of Ranging Request/Response messages for the CID update in a handover to the neighbor BS. However, because the serving BS and the neighbor BS do not share the authentication information of the MS, the MS may transmit a Ranging Request message for the authentication in a handover to the neighbor BS. This will be described below in detail with reference to FIG. 4.

Figure 2:
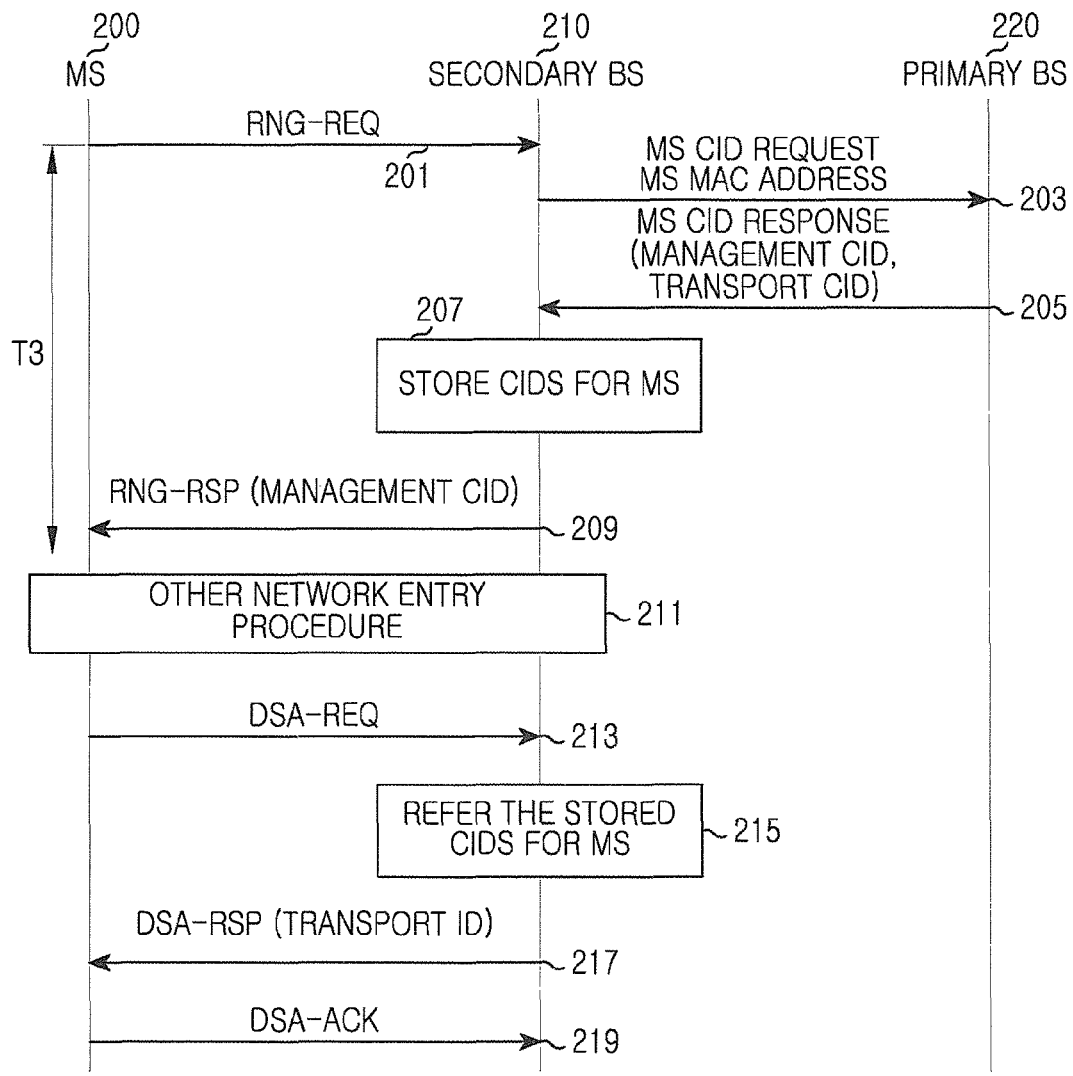
FIG. 2 illustrates an initial network entry process of a mobile station (MS) in a broadband wireless communication system according to an embodiment of the present invention.

FIG. 2 is a signal flow diagram illustrating an initial network entry process of a mobile station (MS) in a broadband wireless communication system according to an embodiment of the present invention. FIG. 2 illustrates a network entry process of an MS that has initially entered the network of a secondary BS.

Referring to FIG. 2, when initially turned on, an MS 200 receives a downlink (DL) signal from a secondary BS 210, which is a BS of a corresponding cell, and uses a preamble of the DL signal to acquire synchronization with the secondary BS 210. Thereafter, the MS 200 exchanges an initial ranging code and a Ranging Response (RNG-RSP) message with the secondary BS 210 to control its uplink (UL) transmission parameters.

Thereafter, in step 201, the MS 200 transmits a Ranging Request (RNG-REQ) message including a MAC address of the MS 200 to the secondary BS 210 by using the uplink resources allocated through an uplink map (UL-MAP: CDMA Allocation IE) from the secondary BS 210.

In step 203, the secondary BS 210 transmits an MS CID Request message including the MAC address of the MS 200 to a primary BS 220 cooperating with the secondary BS 210, to request a transport CID and a management CID (e.g., a basic CID and a primary CID) to be allocated to the MS 200.

In step 205, the primary BS 220 allocates a management CID and a transport CID to the MS 200 and transmits an MS CID Response message including a pair of the CIDs (i.e., the management CID and the transport CID) of the MS 200 to the secondary BS 210.

In step 207, the secondary BS 210 stores the CIDs (i.e., the management CID and the transport CID) of the MS 200. In step 209, the secondary BS 210 transmits a Ranging Response message including the management CID to the MS 200.

In step 211, the MS 200 and the secondary BS 210 perform other network entry processes such as a basic capability negotiation process, an authentication/authorization and key exchange process, and a registration process. That is, the MS 200 and the secondary BS 210 exchange an SS Basic Capability Request (SBC-REQ) message and a SS Basic Capability Response (SBC-RSP) message to perform a basic capability negotiation process, exchange a Privacy Key Management Request (PKM-REQ) message and a Privacy Key Management Response (PKM-RSP) message to perform an authentication/authorization and key exchange process, and exchange a Registration Request (REG-REQ) message and a Registration Response (REG-RSP) message to perform a registration process.

In step 213, in order to set a provisioned service flow in the network, the MS 200 transmits a Dynamic Service Addition Request (DSA-REQ) message to the secondary BS 210 to request service quality parameters.

In step 215, the secondary BS 210 refers the CIDs (i.e., the management CID and the transport CID) of the MS 200 that has been stored in step 207. In step 217, the secondary BS 210 transmits a Dynamic Service Addition Response (DSA-RSP) message including the transport CID as the service quality parameter to the MS 200. In step 219, the MS 200 may transmit a Dynamic Service Addition Acknowledge (DSA-ACK) message to the secondary BS 210 to notify the successful reception of the Dynamic Service Addition Response message.

In this manner, when the MS initially enters the network of the secondary BS, the secondary BS requests/receives the allocated CIDs (i.e., the management CID and the transport CID) of the MS to/from the primary BS and transmits the received CIDs to the MS. That is, the CIDs of the MS are allocated not by the secondary BS accessed by the MS, but by the primary BS cooperating with the secondary BS, so that the primary BS and the secondary BS share the CIDs of the MS.

When the MS has initially entered the network of the primary BS, the MS and the primary BS perform a network entry process in the conventional method. That is, the primary BS directly allocates the CIDs (i.e., the management CID and the transport CID) to the MS in response to a Ranging Request message received from the MS, transmits a Ranging Response message including the management CID to the MS, and transmits a Dynamic Service Addition Response message including the transport CID to the MS. The primary BS transmits a separate message including the CIDs (i.e., the management CID and the transport CID) of the MS to the secondary BS so that the primary BS and the secondary BS may share the CIDs of the MS.

Figure 3:
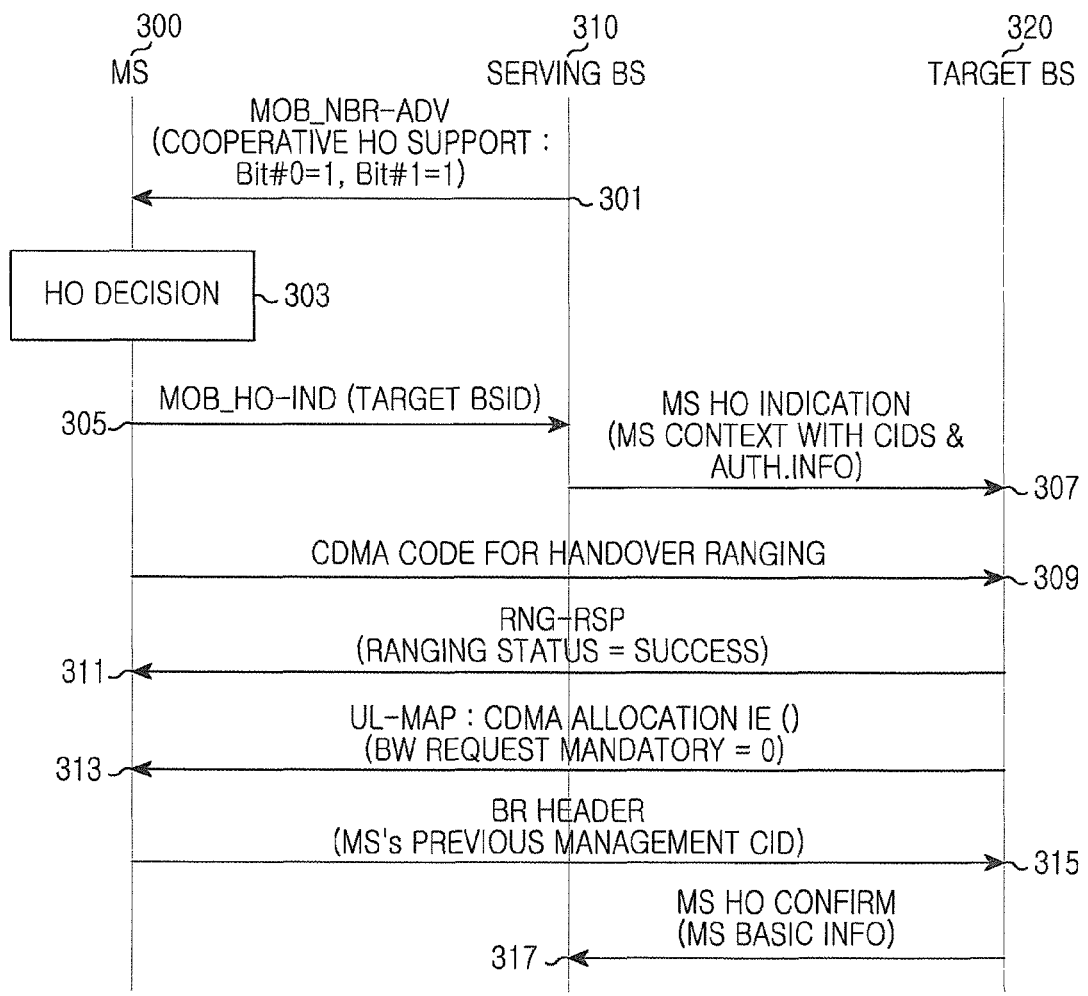
FIG. 3 illustrates a handover process of an MS in a broadband wireless communication system according to an embodiment of the present invention.

FIG. 3 is a signal flow diagram illustrating a handover process of an MS in a broadband wireless communication system according to an embodiment of the present invention. Herein, a serving BS and a target BS may be respectively a primary BS and a secondary BS, or may be respectively a secondary BS and a primary BS, or may be respectively a first secondary BS and a second secondary BS.

Referring to FIG. 3, in step 301, the MS 300 receives a Neighbor Advertisement (MOB_NBR-ADV) message that is periodically broadcasted from a serving BS 310. Herein, the Neighbor Advertisement message is periodically broadcasted from the serving BS 310 to notify information about neighbor BSs to the MS 300. The Neighbor Advertisement message includes cooperative handover support/non-support information of a neighbor BS, which may be detected through a 'Cooperative HO Support' field in the Neighbor Advertisement message. As illustrated in FIG. 3, if the bit #0 and the bit #1 of the 'Cooperative HO Support' field in the Neighbor Advertisement message have a value because the serving BS and the neighbor BS share the CID and the authentication information of the MS, the MS 300 may omit the exchange of Ranging Request/Response messages for the CID update and the authentication and key update in a handover to the neighbor BS.

In step 303, the MS 300 scans the neighbor BSs included in the Neighbor Advertisement message, and exchanges a Handover Request (MOB_HO-REQ) message and a Handover Response (MOB_HO-RSP) message with the serving BS 310 to decide a handover to the neighbor BS, if it is determined from the scanning result that a serving BS change is necessary. In step 305, the MS 300 transmits a Handover Indication (MOB_HO-IND) message including ID information of the neighbor BS (i.e., ID information of the target BS) to the serving BS 310.

In step 307, the serving BS 310 transmits an MS Handover Indication message including the authentication information, the CIDs (the management CID and the transport CID), and the context of the MS 300 to the target BS 320.

In step 309, the MS 300 transmits a handover ranging CDMA code to the target BS 320.

In step 311, if succeeding in receiving the handover ranging CDMA code, the target BS 320 transmits a Ranging Response message to the MS 300 to notify the successful reception of the handover ranging CDMA code.

In step 313, the target BS 320 allocates an uplink (UL) resource for transmission of a Ranging Request message to the MS 300 and transmits an uplink map (UL-MAP: CDMA Allocation IE) including allocation information of the UL resource to the MS 300.

Herein, from the received Neighbor Advertisement message, the MS 300 determines that the exchange of Ranging Request/Response messages for the CID update or the authentication and key update may be omitted in a handover to the target BS 320. Therefore, the MS 300 omits the transmission of a Ranging Request message. In step 315, the MS 300 transmits a Bandwidth Request (BR) header to the target BS 320, by using the previous management CID used in the serving BS 310, through the UL resource allocated from the target BS 320 through the uplink map. In step 317, the target BS 320 may transmit an MS Handover (HO) Confirm message including the basic information of the MS 300 (e.g., the CID of the MS 300) to the serving BS 310 to notify the completion of the handover.

The serving BS 310 and the target BS 320 share the CID of the MS 300. Therefore, after completion of a handover to the target BS 320, the MS 300 may continue to communicate with the target BS 320 by using the CID used in the serving BS 310.

Figure 4:
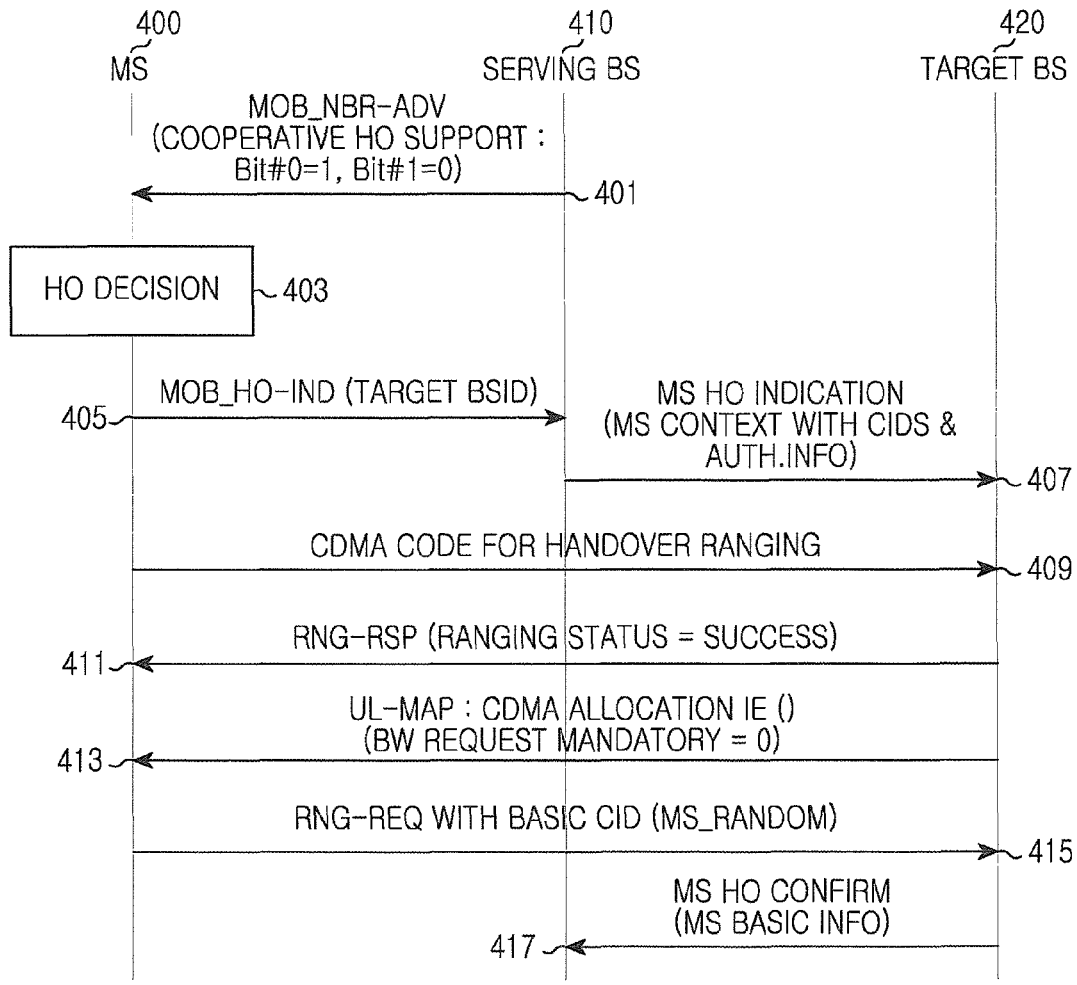
FIG. 4 illustrates a handover process of an MS in a broadband wireless communication system according to another embodiment of the present invention.

FIG. 4 is a signal flow diagram illustrating a handover process of an MS in a broadband wireless communication system according to another embodiment of the present invention. Herein, a serving BS and a target BS may be respectively a primary BS and a secondary BS, or may be respectively a secondary BS and a primary BS, or may be respectively a first secondary BS and a second secondary BS.

Referring to FIG. 4, in step 401, the MS 400 receives a Neighbor Advertisement (MOB_NBR-ADV) message that is periodically broadcasted from a serving BS 410. Herein, the Neighbor Advertisement message is periodically broadcasted from the serving BS 410 to notify information about neighbor BSs to the MS 400. The Neighbor Advertisement message includes cooperative handover support/non-support information of a neighbor BS, which may be detected through a 'Cooperative HO Support' field in the Neighbor Advertisement message. As illustrated in FIG. 4, if the bit #0 and the bit #1 of the 'Cooperative HO Support' field in the Neighbor Advertisement message have a value '1' and a value '0' respectively, because the serving BS 410 and the neighbor BS share the CID of the MS 400, the MS 400 may omit the exchange of Ranging Request/Response messages for the CID update in a handover to the neighbor BS. However, because the serving BS 410 and the neighbor BS do not share the authentication information of the MS, the MS 400 may transmit a Ranging Request message for the authentication in a handover to the neighbor BS.

In step 403, the MS 400 scans the neighbor BSs included in the Neighbor Advertisement message, and exchanges a Handover Request (MOB_HO-REQ) message and a Handover Response (MOB_HO-RSP) message with the serving BS 410 to decide a handover to the neighbor BS, if it is determined from the scanning result that a serving BS change is necessary. In step 405, the MS 400 transmits a Handover Indication (MOB_HO-IND) message including ID information of the neighbor BS (i.e., ID information of the target BS) to the serving BS 410.

In step 407, the serving BS 410 transmits an MS Handover Indication message including the authentication information, the CIDs (the management CID and the transport CID), and the context of the MS 400 to the target BS 420.

In step 409, the MS 400 transmits a handover ranging CDMA code to the target BS 420.

In step 411, if succeeding in receiving the handover ranging CDMA code, the target BS 420 transmits a Ranging Response message to the MS 400 to notify the successful reception of the handover ranging CDMA code.

In step 413, the target BS 420 allocates an uplink (UL) resource for transmission of a Ranging Request message to the MS 400 and transmits an uplink map (UL-MAP: CDMA Allocation IE) including allocation information of the UL resource to the MS 400.

Herein, from the received Neighbor Advertisement message, the MS 400 determines that the CID update may be omitted in a handover to the target BS 420. Therefore, in step 415, the MS 400 transmits a Ranging Request message including the authentication information to the target BS 420, by using the previous management CID (e.g., the basis CID) used in the serving BS 410, through the UL resource allocated from the target BS 420 through the uplink map. In an embodiment, the MS 400 may transmit a random number (MS random), which is randomly generated using the authentication information in the MS Handover Indication message transmitted to the target BS 420, as the authentication information to the target BS 420.

The target BS 420 compares the value randomly generated using the authentication message in the MS Handover Indication message with the MS random received from the MS 400, and authenticates the MS 400 if the two values are identical. In step 417, the target BS 420 may transmit an MS Handover (HO) Confirm message including the basic information of the MS 400 (e.g., the CID of the MS 400) to the serving BS 410 to notify the completion of the handover.

The serving BS 410 and the target BS 420 share the CID of the MS 400. Therefore, after completion of a handover to the target BS 420, the MS 400 may continue to communicate with the target BS 420 by using the CID used in the serving BS 410.

Figure 5A:
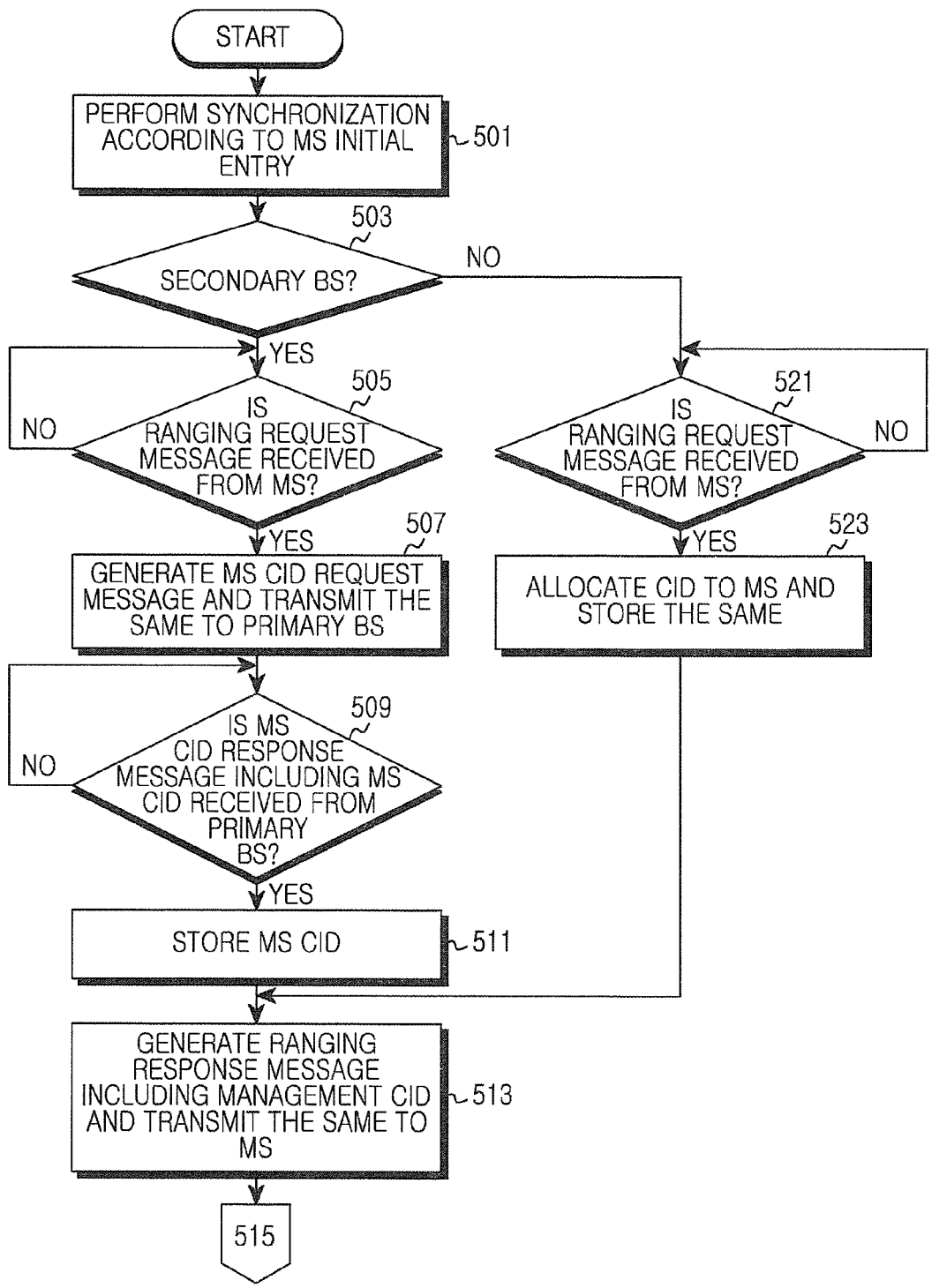
FIGS. 5A and 5B illustrate a method for a base station (BS) to support an initial network entry of an MS in a broadband wireless communication system according to an embodiment of the present invention.
Figure 5B:
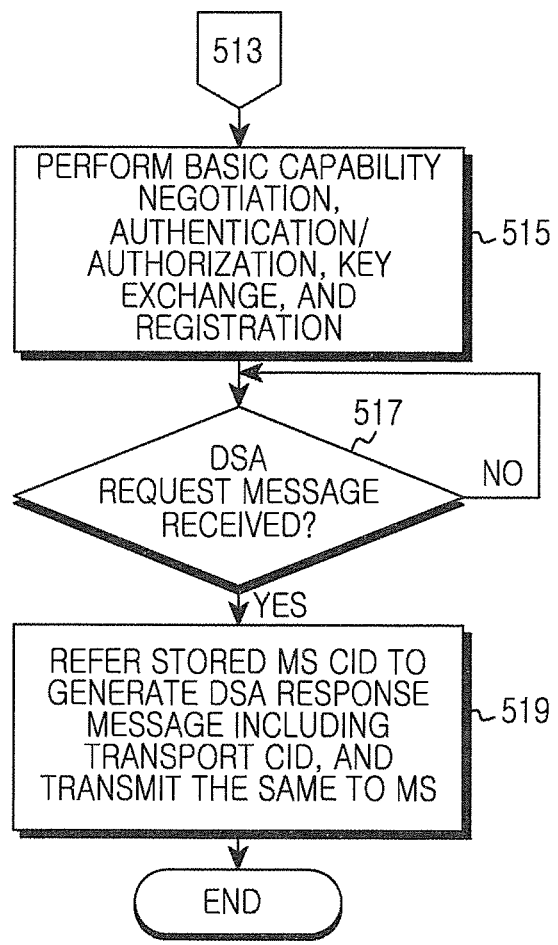

FIGS. 5A and 5B are flow diagrams illustrating a method for a base station (BS) to support an initial network entry of an MS in a broadband wireless communication system according to an embodiment of the present invention. Herein, the BS may be a primary BS or a secondary BS.

Referring to FIG. 5, in step 501, when an MS initially enters the network of a BS, the BS performs synchronization with the MS.

In step 503, the BS determines whether it is a secondary BS.

If it is a secondary BS (in step 503), the BS proceeds to step 505. In step 505, the BS determines whether a Ranging Request message including a MAC address of the MS is received from the MS.

If a Ranging Request message including a MAC address of the MS is received from the MS (in step 505), the BS proceeds to step 507. In step 507, the BS generates an MS CID Request message including the MAC address of the MS, and transmits the generated MS CID Request message to a primary BS cooperating with the BS, to request a transport CID and a management CID (i.e., a basic CID and a primary CID) to be allocated to the MS.

In step 509, the BS determines whether an MS CID Response message including the CID of the MS is received from the primary BS.

If an MS CID Response message including the CID of the MS is received from the primary BS (in step 509), the BS stores the CID of the MS included in the MS CID Response message in step 511 and proceeds to step 513. That is, the BS stores the transport CID and the management CID (i.e., the basic CID and the primary CID) allocated to the MS.

Alternatively, if it is a primary BS (in step 503), the BS proceeds to step 521. In step 521, the BS determines whether a Ranging Request message including a MAC address of the MS is received from the MS.

If a Ranging Request message including a MAC address of the MS is received from the MS (in step 521), the BS proceeds to step 523. In step 523, the BS allocates a CID (i.e., a management CID and a transport CID) to the MS, stores the allocated CID, and proceeds to step 513.

In step 513, the BS generates a Ranging Response message including the management CID of the MS and transmits the generated Ranging Response message to the MS.

In step 515, the BS performs a basic capability negotiation process, an authentication/authorization and key exchange process, and a registration process with the MS.

In step 517, the BS determines whether a Dynamic Service Addition Request (DSA-REQ) message for requesting service quality parameters for setting a provisioned service flow in the network is received from the MS.

If a Dynamic Service Addition Request (DSA-REQ) message is received from the MS (in step 517), the BS proceeds to step 519. In step 519, the BS refers the stored CIDs of the MS, generates a Dynamic Service Addition Response (DSA-RSP) message including the transport CID, and transmits the generated Dynamic Service Addition Response (DSA-RSP) message to the MS.

Thereafter, the BS determines that the initial network entry process of the MS is completed, and ends the algorithm according to the present invention.

Figure 6A:
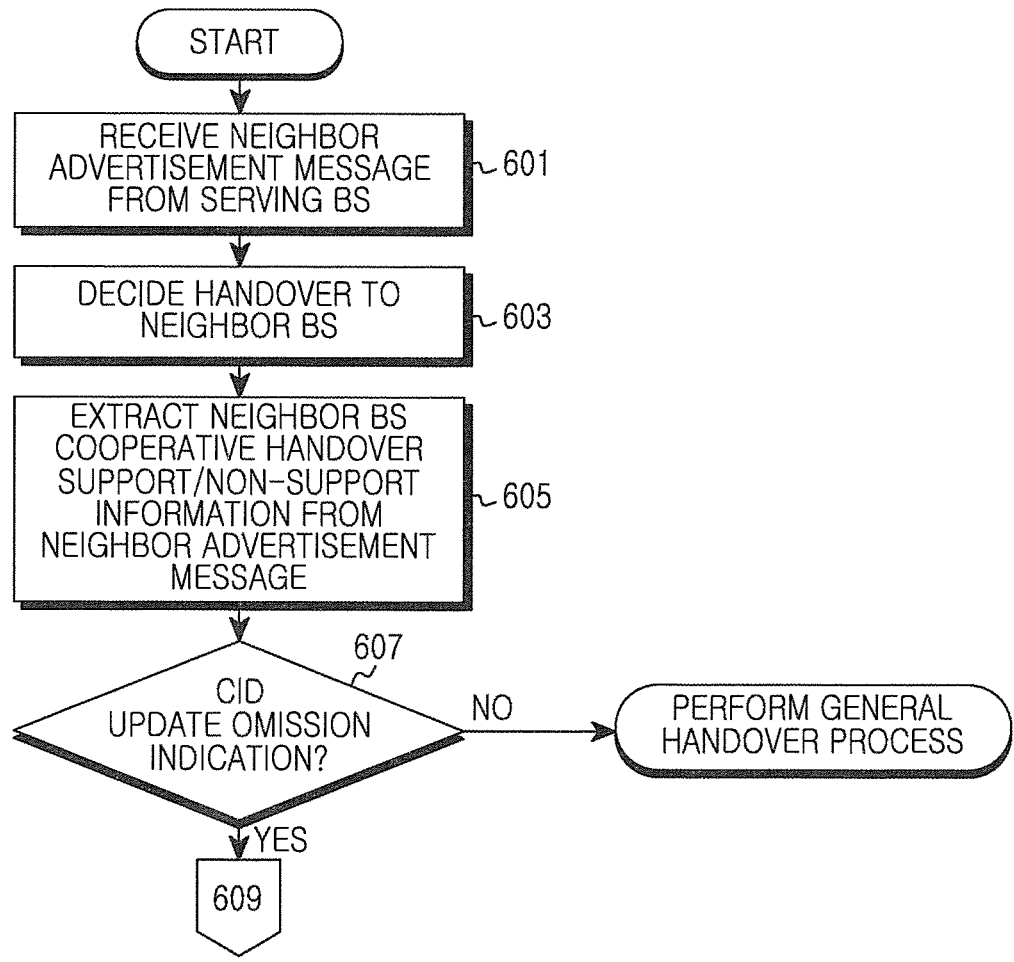
FIGS. 6A and 6B illustrate a method for an MS to receive a Neighbor Advertisement message and perform a handover on the basis of the Neighbor Advertisement message in a broadband wireless communication system according to an embodiment of the present invention.
Figure 6B:
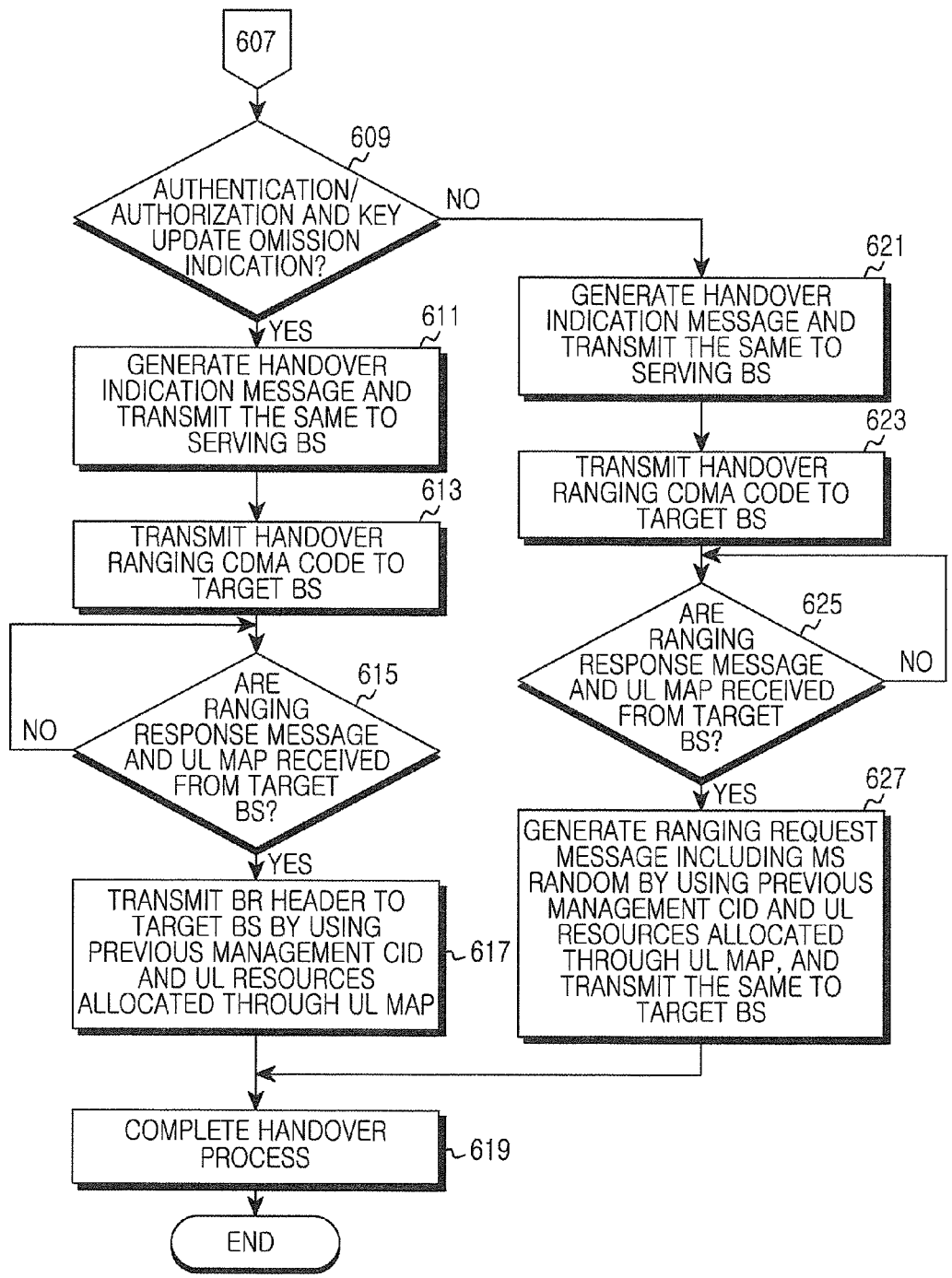

FIGS. 6A and 6B are flow diagrams illustrating a method for an MS to receive a Neighbor Advertisement message and perform a handover on the basis of the Neighbor Advertisement message in a broadband wireless communication system according to an embodiment of the present invention.

Referring to FIG. 6, in step 601, the MS receives a Neighbor Advertisement (MOB_NBR-ADV) message that is periodically broadcasted from a serving BS. Herein, the Neighbor Advertisement message is periodically broadcasted from the serving BS to notify information about neighbor BSs to the MS. The Neighbor Advertisement message includes cooperative handover support/non-support information of a neighbor BS, which may be detected through a 'Cooperative HO Support' field in the Neighbor Advertisement message.

In step 603, the MS scans the neighbor BSs included in the Neighbor Advertisement message, and decides a handover to a neighbor BS according to the scanning result. Herein, the MS scans the neighbor BSs included in the Neighbor Advertisement message, and exchanges a Handover Request (MOB_HO-REQ) message and a Handover Response (MOB_HO-RSP) message with the serving BS to decide a handover to the neighbor BS, if it is determined from the scanning result that a serving BS change is necessary.

In step 605, the MS extracts cooperative handover support/non-support information of the neighbor BS from the Neighbor Advertisement message.

In step 607, the MS determines whether the cooperative handover support/non-support information of the neighbor BS indicates that the exchange of Ranging Request/Response messages for the CID update may be omitted in a handover to the neighbor BS because the neighbor BS supports a cooperative handover. Herein, the bit #0 of a 'Cooperative HO Support' field in the Neighbor Advertisement message indicates whether to omit the CID update through the exchange of Ranging Request/Response messages. The MS may detect the bit #0 of the 'Cooperative HO Support' field to determine whether the exchange of Ranging Request/Response messages for the CID update may be omitted in a handover to the neighbor BS because the neighbor BS supports a cooperative handover.

If the cooperative handover support/non-support information of the neighbor BS indicates that the exchange of Ranging Request/Response messages for the CID update may not be omitted in a handover to the neighbor BS because the neighbor BS does not support a cooperative handover (in step 607), the MS perform a general handover process.

Alternatively, if the cooperative handover support/non-support information of the neighbor BS indicates that the exchange of Ranging Request/Response messages for the CID update may be omitted in a handover to the neighbor BS because the neighbor BS supports a cooperative handover (in step 607), the MS proceeds to step 609. In step 609, the MS determines whether the cooperative handover support/non-support information of the neighbor BS indicates that the CID update may be omitted and the exchange of Ranging Request/Response messages for the authentication and key update may be omitted in a handover to the neighbor BS because the neighbor BS supports a cooperative handover. Herein, the bit #1 of the 'Cooperative HO Support' field indicates whether to omit the authentication and key update through the exchange of Ranging Request/Response messages. The MS may detect the bit #1 of the 'Cooperative HO Support' field to determine whether the exchange of Ranging Request/Response messages for the authentication and key update may be omitted in a handover to the neighbor BS because the neighbor BS supports a cooperative handover.

If the cooperative handover support/non-support information of the neighbor BS indicates that the CID update may be omitted and the exchange of Ranging Request/Response messages for the authentication and key update may be omitted in a handover to the neighbor BS (in step 609), the MS proceeds to step 611. In step 611, the MS generates a Handover Indication (MOB_HO-IND) message including ID information of the neighbor BS (i.e., ID information of the target BS) and transmits the generated Handover Indication message to the serving BS.

In step 613, the MS transmits a handover ranging CDMA code to the target BS. If succeeding in receiving the handover ranging CDMA code, the target BS transmits a Ranging Response message to the MS to notify the successful reception of the handover ranging CDMA code. Also, the target BS allocates an uplink (UL) resource for transmission of a Ranging Request message to the MS and transmits an uplink map (UL-MAP: CDMA Allocation IE) including allocation information of the UL resource to the MS.

In step 615, the MS determines whether the Ranging Response message and the uplink map are received from the target BS.

If the Ranging Response message and the uplink map are received from the target BS (in step 615), the MS proceeds to step 617 because it determines that the exchange of Ranging Request/Response messages for the CID update and the authentication and key update may be omitted in a handover to the target BS from the received Neighbor Advertisement message. In step 617, the MS omits the transmission of a Ranging Request message, and transmits a Bandwidth Request (BR) header to the target BS, by using the previous management CID used in the serving BS, through the UL resource allocated from the target BS through the uplink map.

In step 619, the MS completes the handover process. Thereafter, the MS ends the algorithm according to the present invention.

Alternatively, if the cooperative handover support/non-support information of the neighbor BS indicates that the CID update may be omitted and the exchange of Ranging Request/Response messages for the authentication and key update may not be omitted in a handover to the neighbor BS (in step 609), the MS proceeds to step 621. In step 621, the MS generates a Handover Indication (MOB_HO-IND) message including ID information of the neighbor BS (i.e., ID information of the target BS) and transmits the generated Handover Indication message to the serving BS.

In step 623, the MS transmits a handover ranging CDMA code to the target BS. If succeeding in receiving the handover ranging CDMA code, the target BS transmits a Ranging Response message to the MS to notify the successful reception of the handover ranging CDMA code. Also, the target BS allocates an uplink (UL) resource for transmission of a Ranging Request message to the MS and transmits an uplink map (UL-MAP: CDMA Allocation IE) including allocation information of the UL resource to the MS.

In step 625, the MS determines whether the Ranging Response message and the uplink map are received from the target BS.

If the Ranging Response message and the uplink map are received from the target BS (in step 625), the MS proceeds to step 627 because it determines that the CID update may be omitted in a handover to the target BS from the received Neighbor Advertisement message. In step 627, the MS generates a Ranging Request message including authentication information (i.e., an MS random), by using the previous management CID (e.g., the basic CID) used in the serving BS, through the UL resource allocated from the target BS through the uplink map, and transmits the generated Ranging Request message to the target BS. Thereafter, the MS proceeds to step 619.

Figure 7:
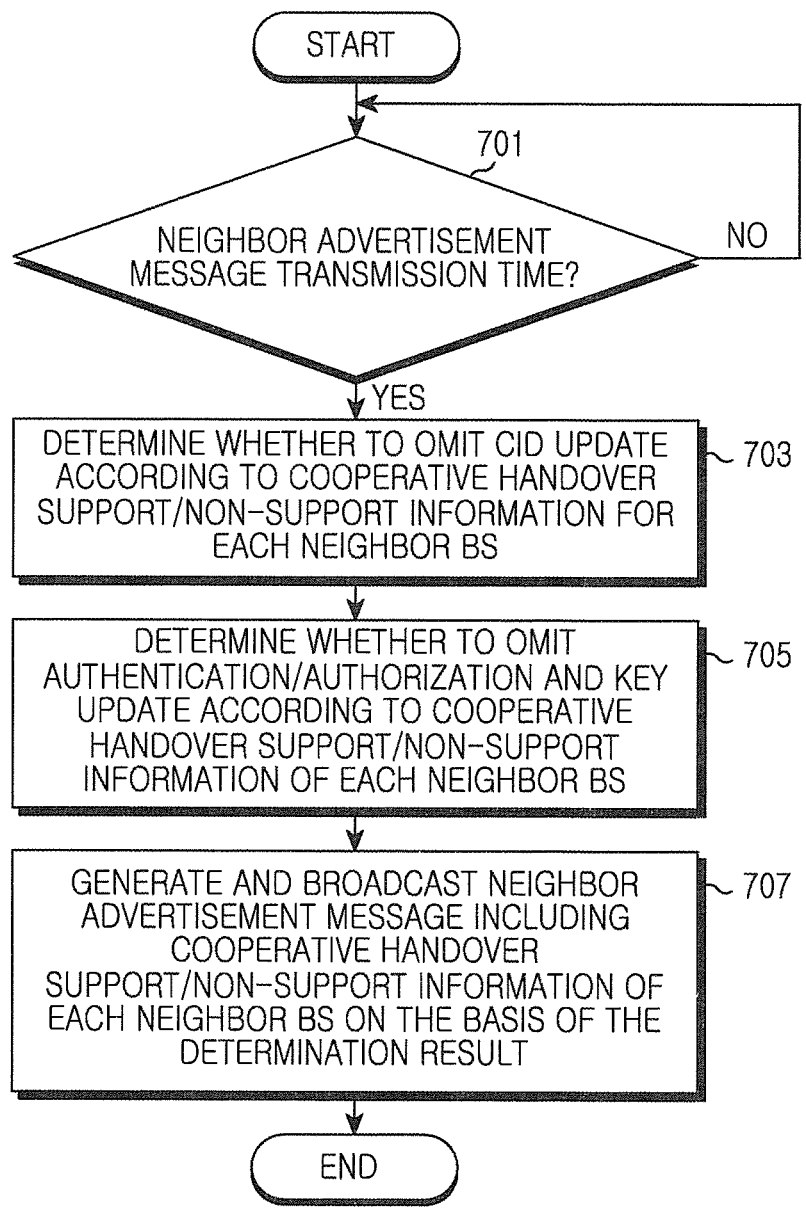
FIG. 7 illustrates a method for a serving BS to transmit a Neighbor Advertisement message to an MS to support a handover of the MS in a broadband wireless communication system according to an embodiment of the present invention.

FIG. 7 is a flow diagram illustrating a method for a serving BS to transmit a Neighbor Advertisement message to an MS to support a handover of the MS in a broadband wireless communication system according to an embodiment of the present invention.

Referring to FIG. 7, in step 701, the serving BS determines whether it is time to transmit a Neighbor Advertisement message that is periodically broadcasted.

If it is time to transmit the Neighbor Advertisement message (in step 701), the serving BS proceeds to step 703. In step 703, the serving BS determines whether to omit the CID update according to the cooperative handover support/non-support information of each neighbor BS.

In step 705, the serving BS determines whether to omit the authentication and key update according to the cooperative handover support/non-support information of each neighbor BS.

In step 707, the serving BS generates a Neighbor Advertisement message including the cooperative handover support/non-support information of each neighbor BS on the basis of the determination result, and broadcasts the generated Neighbor Advertisement message. According to the present invention, the cooperative handover support/non-support information of the neighbor BS may be included in a 'Cooperative HO Support' field of the Neighbor Advertisement message. Herein, the bit #0 of the 'Cooperative HO Support' field indicates whether to omit the CID update through the exchange of Ranging Request/Response messages, and the bit #1 indicates whether to omit the authentication and key update through the exchange of Ranging Request/Response messages. Herein, a value '1' indicates the support of the cooperative handover, and a value '0' indicates the non-support of the cooperative handover.

Thereafter, the serving BS ends the algorithm according to the present invention.

Figure 8:
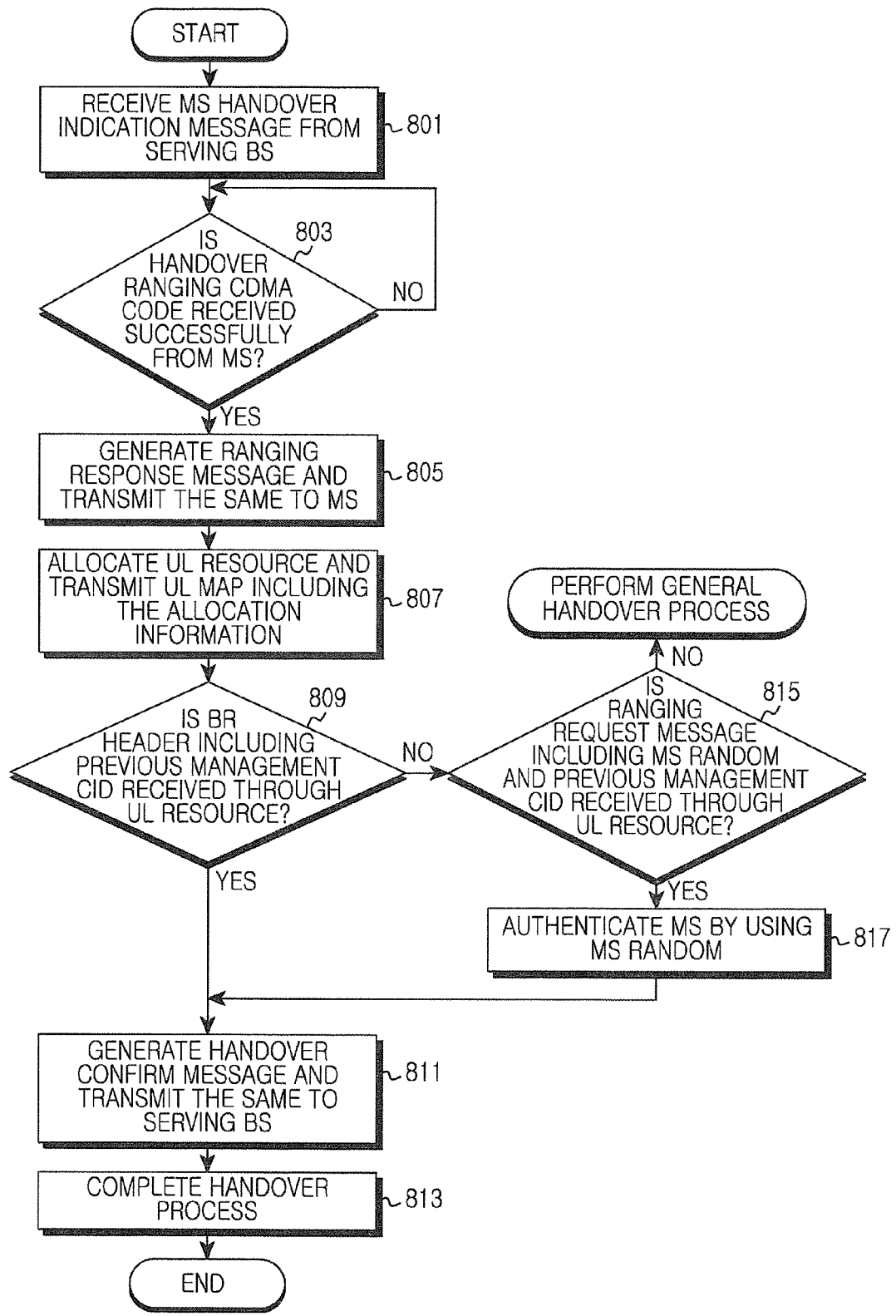
FIG. 8 illustrates a method for a target BS to support a handover of an MS in a broadband wireless communication system according to an embodiment of the present invention.

FIG. 8 is a flow diagram illustrating a method for a target BS to support a handover of an MS in a broadband wireless communication system according to an embodiment of the present invention.

Referring to FIG. 8, in step 801, the target BS receives an MS Handover Indication message including the authentication information, the CIDs (the management CID and the transport CID), and the context of the MS from the serving BS.

In step 803, the target BS determines whether a handover ranging CDMA code is successfully received from the MS.

If a handover ranging CDMA code is successfully received from the MS (in step 803), the target BS proceeds to step 805. In step 805, the target BS generates a Ranging Response message for notifying the successful reception of the handover ranging CDMA code and transmits the generated Ranging, Response message to the MS.

In step 807, the target BS allocates an uplink (UL) resource for transmission of a Ranging Request message to the MS and transmits an uplink map (UL-MAP: CDMA Allocation IE) including allocation information of the UL resource to the MS.

In step 809, the target BS determines whether a Bandwidth Request (BR) header including the previous management CID of the MS used in the serving BS (not a general Ranging Request message) is received from the MS through the uplink resource allocated to the MS through the uplink map.

If a Bandwidth Request (BR) header including the previous management CID of the MS used in the serving BS (not a general Ranging Request message) is received from the MS through the uplink resource allocated to the MS through the uplink map (in step 809), the target BS proceeds to step 811. In step 811, the target BS generates an MS Handover (HO) Confirm message including the basic information of the MS (e.g., the CID of the MS) and transmits the generated MS Handover Confirm message to the serving BS to notify the completion of the handover.

In step 813, the target BS completes the handover process of the MS. Thereafter, the target BS ends the algorithm according to the present invention.

Alternatively, if a Bandwidth Request (BR) header including the previous management CID of the MS used in the serving BS is not received from the MS through the uplink resource allocated to the MS through the uplink map (in step 809), the target BS proceeds to step 815. In step 815, the target BS determines whether a Ranging Request message including the authentication information (i.e., an MS random) and the previous management CID (e.g., the basic CID) of the MS used in the serving BS (not a general Ranging Request message) is received from the MS through the UL resource allocated to the MS through the uplink map.

If a Ranging Request message including the authentication information (i.e., an MS random) and the previous management CID (e.g., the basic CID) of the MS used in the serving BS (not a general Ranging Request message) is not received from the MS through the UL resource allocated to the MS through the uplink map (in step 815), the target BS determines that a general Ranging Request message through the UL resource is allocated to the MS through the uplink map, and performs a general handover process.

Alternatively, if a Ranging Request message including the authentication information (i.e., an MS random) and the previous management CID (e.g., the basic CID) of the MS used in the serving BS (not a general Ranging Request message) is received from the MS through the UL resource allocated to the MS through the uplink map (in step 815), the target BS proceeds to step 817. In step 817, the target BS compares the value randomly generated using the authentication message in the MS Handover Indication message with the MS random received from the MS, and authenticates the MS if the two values are identical. Thereafter, the target BS proceeds to step 811.

Figure 9:
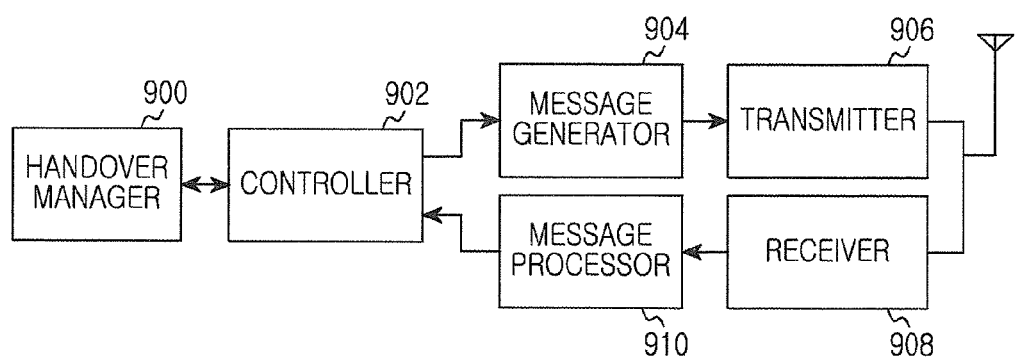
FIG. 9 is a block diagram of an MS in a broadband wireless communication system according to an embodiment of the present invention.

FIG. 9 is a block diagram of an MS in a broadband wireless communication system according to an embodiment of the present invention.

Referring to FIG. 9, the MS includes a handover manager 900, a controller 902, a message generator 904, a transmitter 906, a receiver 908, and a message processor 910.

The handover manager 900 decides a handover to a neighbor BS, provides handover-related information for a handover process to the message generator 904 through the controller 902, and processes handover-related information received from the message processor 910 through the controller 902. According to the present invention, the handover manager 900 receives a Neighbor Advertisement (MOB_NBR-ADV) message broadcasted periodically from a serving BS, detects cooperative handover support/non-support information of the neighbor BS, and omits the CID update or the authentication and key update through the exchange of Ranging Request/Response messages, in a handover to the neighbor BS in the Neighbor Advertisement message, on the basis of the cooperative handover support/non-support information of the neighbor BS.

The controller 902 controls an overall operation of the MS.

The message generator 904 generates a message on the basis of the information received from the controller 902, and provides the generated message to the transmitter 906.

The transmitter 906 encodes and modulates the message received from the message generator 904, and transmits the resulting signal through an antenna to a BS.

The receiver 908 demodulates and decodes the signal received through an antenna from a BS, and provides the resulting message to the message processor 910.

The message processor 910 extracts information from the message received from the receiver 908, and provides the extracted information to the controller 902.

The configurations of a serving BS and a neighbor BS according to the present invention will be described below. Since the serving BS and the neighbor BS may have the same interface module (communication module), they may be described using the same block configuration. Thus, the operations of the serving BS and the neighbor BS will be described with reference to the same block diagram.

Figure 10:
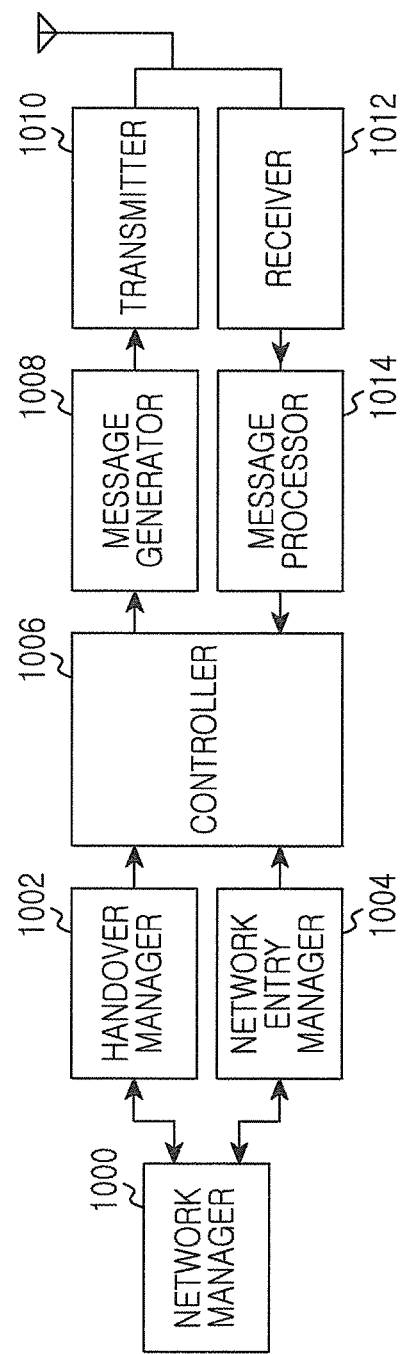
FIG. 10 is a block diagram of a BS in a broadband wireless communication system according to an embodiment of the present invention.

FIG. 10 is a block diagram of a BS in a broadband wireless communication system according to an embodiment of the present invention. Since the serving BS, the target BS, the primary BS, and the secondary BS may have the same configuration, the configuration of the BS will be described on the basis of the same configuration.

Referring to FIG. 10, the BS includes a network manager 1000, a handover manager 1002, a network entry manager 1004, a controller 1006, a message generator 1008, a transmitter 1010, a receiver 1012, and a message processor 1014.

The network manager 1000 communicates with another BS through an X2 interface. That is, the network manager 1000 processes a message received from another BS, provides handover-related information to the handover manager 1002, and provides network entry-related information to the network entry manager 1004. Also, the network manager 1000 generates a message on the basis of the handover-related information received from the handover manager 1002 or the network entry-related information received from the network entry manager 1004, and transmits the generated message to another BS.

The handover manager 1002 processes and manages a handover of an MS. The handover manager 1002 provides handover-related information for a handover process with the MS to the message generator 1008 through the controller 1006, and processes handover-related information received through the controller 1006 from the message processor 1014. Also, when a communication with another BS is associated with a handover process, the handover manager 1002 provides the handover-related information to the network manager 1000 and processes the handover-related information received from the network manager 1000. The handover manager 1002 of the serving BS periodically broadcasts a Neighbor Advertisement (MOB_NBR-ADV) message including the cooperative handover support/non-support information of the neighbor BS. When an MS of the serving BS cooperating with the target BS performs a handover, the handover manager 1002 of the target BS omits the CID update or the authentication and key update through the exchange of Ranging Request/Response messages.

The network entry manager 1004 processes and manages an initial network entry of an MS. The network entry manager 1004 provides network entry-related information for an initial network entry process of the MS to the message generator 1008 through the controller 1006, and processes network entry-related information received from the message processor 1014 through the controller 1006. Also, when a communication with another BS is associated with an initial network entry process, the network entry manager 1004 provides the network entry-related information to the network manager 1000 and processes the network entry-related information received from the network manager 1000. The secondary BS allocates a CID to an MS, having initially accessed the secondary BS, through the primary BS cooperating with the secondary BS. To this end, by communication with the primary BS through the network manager 1000, the network entry manager 1004 of the secondary BS obtains a CID of the MS having initially accessed the secondary BS, and provides the obtained CID to the MS. The primary BS allocates a CID not only to the MS within its own coverage but also to the MS within the coverage of the secondary BS. To this end, according to the request form the secondary BS through the network manager 1000, the network entry manager 1004 of the primary BS allocates a CID to the MS having initially accessed the secondary BS, and provides the allocated CID to the secondary BS through the network manager 1000.

The controller 1006 controls an overall operation of the BS.

The message generator 1008 generates a message on the basis of the information received from the controller 1006, and provides the generated message to the transmitter 1010.

The transmitter 1010 encodes and modulates the message received from the message generator 1008, and transmits the resulting signal through an antenna to the MS.

The receiver 1012 demodulates and decodes the signal received through an antenna from an MS, and provides the resulting message to the message processor 1014.

The message processor 1014 extracts information from the message received from the receiver 1012, and provides the extracted information to the controller 1006.

Although not illustrated, in a wireless communication system according to an embodiment of the present invention, an MS may support a cooperative handover by deciding a handover to a target BS and omitting a CID update process of the MS during the handover process to the target BS. Herein, the CID of the MS is shared beforehand between a serving BS and the target BS.

Also, in a wireless communication system according to an embodiment of the present invention, a target BS may support a cooperative handover by sharing beforehand a CID of an MS with a serving BS of the MS and omitting a CID update process of the MS during a handover process to the MS.

Also, an apparatus of an MS in a wireless communication system according to an embodiment of the present invention includes a handover manager configured to decide a handover to a target BS and omit a CID update process of the MS during the handover process to the target BS, and a transmitter/receiver configured to transmit/receive handover-related information for a handover process with the target BS, wherein the CID of the MS is shared beforehand between a serving BS and the target BS.

Also, an apparatus of a target BS in a wireless communication system according to an embodiment of the present invention includes a network entry manager configured to share beforehand a CID of an MS with a serving BS of the MS; and a handover manager configured to omit a CID update process of the MS during a handover process to the MS.

As described above, according to the present invention, the primary BS allocates a CID to an MS, having initially entered the primary BS or a secondary BS, and shares the CID of the MS with the secondary BS in a broadband wireless communication system including the primary BS and the secondary BS that support a cooperative handover. Also, the present invention selectively omits the CID update or the authentication and key update through the exchange of Ranging Request/Response messages, in an MS handover between the primary BS and the secondary BS. Accordingly, the present invention may reduce a handover latency time of the MS and may provide an efficient use of wireless resources. The present invention may be more effective in an MS handover between a macro BS and femto BS subordinated hierarchically to the macro BS, or in an MS handover between femto BSs.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A method for operating a mobile station (MS) in a wireless communication system, the method comprising:
receiving identification information from a serving BS during a network entry process for accessing the serving base station (BS), wherein the identification information is allocated by a first neighbor BS that shares information relating to the MS with the serving BS;
receiving information indicating at least one neighbor BS that shares the information relating to the MS with the serving BS, wherein the at least one neighbor BS comprises the first neighbor BS;
detecting a handover event to a target BS from the serving BS; and
determining whether to omit a process for updating the identification information during a handover process for the target BS based on whether the target BS corresponds to the at least one neighbor BS.

2. The method of claim 1, wherein
the receiving of the information indicating at least one neighbor BS that shares the information relating to the MS with the serving BS comprises:
receiving a neighbor advertisement message, including cooperative handover support or non-support information of neighbor BSs, from the serving BS; and
determining whether to omit the process for updating the identification information comprises:
extracting the cooperative handover support or non-support information of the neighbor BSs from the neighbor advertisement message, and
determining whether the target BS corresponds to the at least one neighbor BS based on the cooperative handover support or non-support information of the neighbor BSs, and
determining to omit the process for updating the identification information during the handover process for the target BS when the target BS supports cooperative handover.

3. The method of claim 2, wherein the identification information comprises a connection identifier (CID), and
wherein the process for updating the identification information comprises at least one of a CID update process or an authentication and key update process.

4. The method of claim 3, wherein the neighbor advertisement message includes a cooperative handover support field for each of the neighbor BSs,
wherein a first bit of the cooperative handover support field indicates whether to omit the CID update process, and a second bit indicates whether to omit the authentication and key update process.

5. The method of claim 4, further comprising:
receiving an uplink map, including allocation information of uplink resources for transmission of a ranging request message, from the target BS; and
transmitting a bandwidth request header to the target BS, through the allocated uplink resources, by using a previous management CID used in the serving BS, if both the authentication and key update process and the CID update process of the MS are omitted on the basis of the cooperative handover support or non-support information of the target BS.

6. The method of claim 4, further comprising:
receiving an uplink map, including allocation information of uplink resources for transmission of a ranging request message, from the target BS; and
transmitting a ranging request message including authentication information to the target BS, through the allocated uplink resources, by using a previous CID used in the serving BS, when the CID update process of the MS is omitted on the basis of the cooperative handover support or non-support information of the target BS.

7. A method for operating a neighbor base station (BS) in a wireless communication system, the method comprising:
receiving, from a serving BS, a message requesting identification information identifying a mobile station (MS) configured to perform a network entry process for accessing the serving BS;
allocating the identification information to the MS;
transmitting, to the serving BS, the allocated identification information; and
broadcasting, by the neighbor BS, a neighbor advertisement message including information indicating at least one other BS that shares information relating to the MS with the neighbor BS.

8. The method of claim 7, further comprising:
receiving a handover message comprising the identification information identifying the MS from the serving BS; and
omitting, by the neighbor BS, a process for updating the identification information identifying the MS during a handover of the MS.

9. The method of claim 8, wherein the identification information comprises a connection identifier (CID), and
wherein the process for updating the identification information identifying the MS comprises at least one of a CID update process and an authentication and key update process.

10. The method of claim 9, further comprising:
transmitting an uplink map, including allocation information of uplink resources for transmission of a ranging request message, to the MS; and
receiving a bandwidth request header, including a previous CID used in the serving BS by the MS, through the uplink resources from the MS.

11. The method of claim 8, further comprising:
transmitting an uplink map, including allocation information of uplink resources for transmission of a ranging request message, to the MS; and
receiving a ranging request message, including authentication information and a previous CID used in the serving BS by the MS, through the uplink resources from the MS.

12. The method of claim 7,
wherein the at least one other BS comprises the serving BS.

13. The method of claim 12,
wherein the neighbor advertisement message includes a cooperative handover support field for each of the at least one other BS,
wherein a first bit of the cooperative handover support field indicates whether to omit a CID update process, and a second bit indicates whether to omit an authentication and key update process.

14. An apparatus of a mobile station (MS) in a wireless communication system, the apparatus comprising:
a transceiver configured to:
receive identification information from a serving BS during a network entry process for accessing the serving BS, wherein the identification information is allocated by a neighbor BS that shares information relating to the MS with the serving BS, and
receive information indicating at least one neighbor BS that shares the information relating to the MS with the serving BS; and
a controller configured to detect a handover to a target base station (BS) from the serving BS, and determine whether to omit a process for updating the identification information during a handover process for the target BS, based on whether the target BS corresponds to the at least one neighbor BS.

15. The apparatus of claim 14, wherein the transceiver is configured to receive a neighbor advertisement message, including cooperative handover support or non-support information of neighbor BSs, from the serving BS; and
wherein the controller is configured to:
extract the cooperative handover support or non-support information of neighbor BSs from the neighbor advertisement message, and
determine whether the target BS corresponds to the at least one neighbor BS based on the cooperative handover support or non-support information of neighbor BSs, and
omit the process for updating the identification information during the handover process for the target BS when the target BS supports cooperative handover.

16. The apparatus of claim 14, wherein the identification information comprises a connection identifier (CID), and
wherein the process for updating the identification information comprises at least one of a CID update process and an authentication and key update process.

17. The apparatus of claim 16, wherein a neighbor advertisement message includes a cooperative handover support field for each of the neighbor BSs,
wherein a first bit of the cooperative handover support field indicates whether to omit the CID update process, and a second bit indicates whether to omit the authentication and key update process.

18. The apparatus of claim 17, wherein the transceiver is further configured to:
receive an uplink map, including allocation information of uplink resources for transmission of a ranging request message, from the target BS; and
transmit a bandwidth request header to the target BS, through the allocated uplink resources, by using a previous management CID used in the serving BS, if both the authentication and key update process and the CID update process of the MS are omitted on the basis of the cooperative handover support or non-support information of the target BS.

19. The apparatus of claim 17, wherein the transceiver is further configured to:
receive an uplink map, including allocation information of uplink resources for transmission of a ranging request message, from the target BS; and
transmit a ranging request message including authentication information to the target BS, through the allocated uplink resources, by using a previous CID used in the serving BS, when the CID update process of the MS is omitted on the basis of the cooperative handover support or non-support information of the target BS.

20. An apparatus of a neighbor base station (BS) in a wireless communication system, the apparatus comprising:
a transceiver; and
a controller configured to:
receive, from a serving BS, a message for requesting identification information identifying a mobile station (MS) configured to performs a network entry process for accessing the serving BS,
allocate the identification information to the MS,
transmit, to the serving BS, the allocated identification information, and broadcast a neighbor advertisement message including information indicating at least one other BS that shares the information relating to the MS with the neighbor BS.

21. The apparatus of claim 20, wherein the identification information comprises a connection identifier (CID), and
wherein a process for updating the identification information comprises at least one of a CID update process and an authentication and key update process.

22. The apparatus of claim 20, wherein the transceiver is configured to receive a handover message comprising the identification information identifying the MS from the serving BS, and
wherein the controller is further configured to omit a process for updating the identification information identifying the MS during a handover of the MS.

23. The apparatus of claim 22, wherein the transceiver is configured to:
transmit an uplink map, including allocation information of uplink resources for transmission of a ranging request message, to the MS, and
receive a bandwidth request header, including a previous CID used in the serving BS by the MS, through the uplink resources from the MS.

24. The apparatus of claim 22, wherein the transceiver is further configured to:
transmit an uplink map, including allocation information of uplink resources for transmission of a ranging request message, to the MS; and
receive a ranging request message, including authentication information and a previous CID used in the serving BS by the MS, through the uplink resources from the MS.

25. The apparatus of claim 20,
wherein the at least one other BS comprises the serving BS.

26. The apparatus of claim 25, wherein the neighbor advertisement message includes a cooperative handover support field for each of the at least one other BS,
wherein a first bit of the cooperative handover support field indicates whether to omit a CID update process, and a second bit indicates whether to omit an authentication and key update process.

27. A method for operating a serving base station (BS) in a wireless communication system, the method comprising:
transmitting, to a neighbor BS, a message for requesting identification information identifying a mobile station (MS) during a network entry process of the MS for the serving BS;
receiving, from the neighbor BS, the identification information identifying the MS during the network entry process of the MS, wherein the identification information identifying the MS is allocated to the MS by the neighbor BS;
transmitting, to the MS, the identification information identifying the MS during the network entry process of the MS; and
broadcasting, by the serving BS, a neighbor advertisement message including information indicating at least one neighbor BS that shares information relating to the MS with the serving BS.

28. The method of claim 27, further comprising:
transmitting, to the neighbor BS, a handover message comprising the identification information identifying the MS;
wherein a process for updating identification information for the MS is omitted during a handover of the MS.

29. The method of claim 27, wherein the at least one neighbor BS that shares the information relating to the MS with the serving BS includes the neighbor BS.

30. The method of claim 29, wherein the neighbor advertisement message includes a cooperative handover support field for each of the at least one neighbor BS,
wherein a first bit of the cooperative handover support field indicates whether to omit a CID update process, and a second bit indicates whether to omit an authentication and key update process.

31. An apparatus of a serving base station (BS) in a wireless communication system, the apparatus comprising:
a transceiver configured to broadcast a neighbor advertisement message including information indicating at least one neighbor BS that shares information relating to a mobile station (MS) with the serving BS; and
a controller configured to:
transmit, to a neighbor BS, a message for requesting identification information identifying the MS during a network entry process of the MS for the serving BS,
receive, from the neighbor BS, the identification information identifying the MS during the network entry process of the MS, the identification information identifying the MS being allocated to the MS by the neighbor BS, and
transmit, to the MS, the identification identifying the MS during the network entry process of the MS.

32. The apparatus of claim 31, wherein the transceiver is configured to transmit, to the neighbor BS, a handover message comprising the identification information identifying the MS,
wherein a process for updating identification information for the MS is omitted during a handover of the MS.

33. The apparatus of claim 31, wherein the at least one neighbor BS that shares the information relating to the MS with the serving BS includes the neighbor BS.

34. The apparatus of claim 33, wherein the neighbor advertisement message includes a cooperative handover support field for each of the at least one neighbor BS, and
wherein a first bit of the cooperative handover support field indicates whether to omit a CID update process, and a second bit indicates whether to omit an authentication and key update process.

* * * * *